United States Patent Office 3,099,458
Patented July 30, 1963

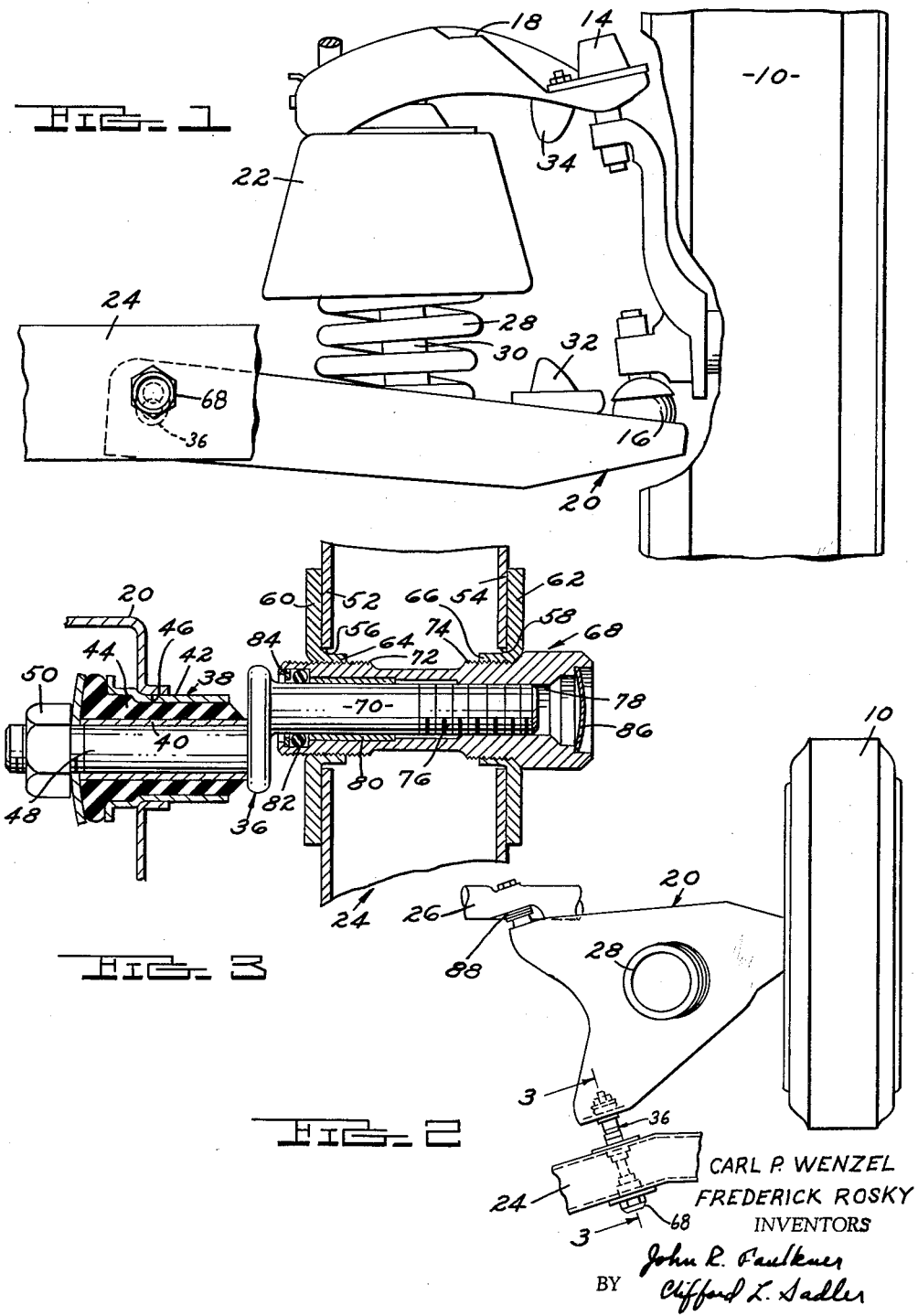
CARL P. WENZEL
FREDERICK ROSKY
INVENTORS

3,099,458
VEHICLE SUSPENSION SYSTEM
Frederick Rosky, Dearborn, and Carl P. Wenzel, Garden City, Mich., assignors to Ford Motor Company, Dearborn, Mich., a corporation of Delaware
Filed Jan. 15, 1962, Ser. No. 166,124
7 Claims. (Cl. 280—96.2)

The present invention relates generally to vehicle suspension systems and more particularly to an improved suspension adapted to absorb minor road shocks.

The conventional vehicle suspension system resiliently supports the body upon the wheels. The wheels are adapted to traverse vertical jounce and rebound paths in response to road obstacles that may be encountered. When the wheel strikes an object, both horizontal and vertical force components are present. The vertical component causes vertical wheel movement. In the conventional suspension system provisions are not made for absorbing the horizontal components which results in a shock being transmitted directly to the passenger compartment of the vehicle. This objectionable shock is most noticeable when the wheel encounters minor bumps such as the asphalt expansion joint used in concrete pavement.

In view of the state of the art, it is the principal object of the present invention to provide a suspension system adapted to absorb both horizontal and vertical forces.

More specifically, it is an object of the present invention to provide a suspension construction for joining the sprung and unsprung components that permits the wheel to give or recede horizontally upon impact.

In one embodiment of the present invention, a front vehicle wheel is connected to a chassis frame by means of a suspension arm. The arm is pivotally connected to the frame by fore and aft pivots. The rear pivot is adapted to permit jounce and rebound wheel movement and further, to permit pivotal movement in a horizontal plane. A crank-shaped pivot pin joins the forward leg of the arm to the frame. This pin has vertically off-set pivot axes so that the arm is suspended in a pendulum fashion. Under the influence of horizontal forces, the crank-shaped pin will rotate to permit the arm to pivot about its rear pivot support resulting in longitudinal wheel movement or recession.

The objects and advantages of the present invention will become apparent from the following discussion and the accompanying drawings in which:

FIGURE 1 is a front elevational view of a vehicle having a suspension system construction in accordance with this invention;

FIGURE 2 is a top plan view of the suspension of FIGURE 1; and

FIGURE 3 is a sectional view taken along section lines 3—3 of FIGURE 2.

Referring now to the drawings for a full disclosure of an embodiment of the present invention, FIGURE 1 discloses an independent front suspension system for a motor vehicle. A vehicle wheel 10 is rotatably supported upon a wheel spindle 12. The spindle 12 carries upper and lower ball joint assemblies 14 and 16. Upper and lower suspension arms 18 and 20 are connected at their outer ends to the ball joint assemblies 14 and 16. The inner end of the upper arm 18 is pivotally secured to reinforced body structure 22 in a conventional fashion. Fore and aft cross-frame members 24 and 26 pivotally support the lower arm 20.

A coil type suspension spring 28 is seated on the lower arm 20 and has its upper end secured to the same reinforced body structure 22 that supports the arm 18. A telescopic type shock absorber is interposed between the lower arm 20 and the structure 22 and is positioned concentrically within the coil spring 28.

The spring 28 resiliently supports the body and frame of the vehicle upon the lower arm 20. The construction and interconnection of the upper and lower arms 18 and 20 permits the wheel 10 to transverse a vertical jounce and rebound path upon encounter with a road obstacle. A rubber jounce stop 32 is secured to the lower arm 20 and a rubber rebound stop 34 is secured to the upper arm 18. The stops 32 and 34 will strike the reinforced structure 22 encircling the spring 28 in the event of extreme vertical wheel movement.

The lower arm 20 has a generally triangular shape with its outer apex secured to the ball joint assembly 18. The forward corner of the arm 20 is secured to the forward cross-frame member 24 by a crank-shaped pivot pin 36.

A bushing assembly 38 having inner and outer metallic sleeves 40 and 42 that are separated by a cylindrical rubber element 44 is positioned within an opening 46 provided in the arm 20. The rear or arm end 48 of the crank-shaped pin 36 is received within the inner sleeve 40 of the bushing assembly 38 and secured in position by a threaded nut 50. This construction permits the pin 36 to rotate relative to the arm 20 by distortion of the rubber element 44.

The forward cross-frame member 24 has a box-shaped cross sectional configuration and includes a pair of sidewalls 52 and 54. Openings 56 and 58 are provided in the sidewalls 52 and 54. Reinforcing members 60 and 62 are welded to the sidewalls 52, 54 and have axially extending portions 64 and 66 that protrude inwardly through the openings 56 and 58 into the interior of the frame member 24. A generally cylindrical plug 68 engages the reinforcing plate 60, 62 and is adapted to receive the forward or frame end 70 of the crank-shaped pin 36.

The exterior surface of the plug 68 is provided with a pair of spaced apart threaded portions 72 and 74 that are adapted to engage the axial portions 64 and 66 respectively of the plates 60, 62. The diameter of the rear threaded portion 72 is less than the diameter of the forward threaded portion 74 so that the inner end of the plug 68 may be passed through the opening in the plate 62 and the threaded portions 72, 74 will engage their mating members at the same time. The design of the threads at portions 72 and 74 is selected so that they will be self-tapping to eliminate the need for preforming threads on the axial portions 64, 66 of members 60, 62.

The interior of the plug 68 is hollow to receive the end 70 of the crank-shaped pin 36. The outer end portion of the frame end 70 of the pin 36 is threaded as at 76. Complementary threads 78 are provided in the interior of the plug 68. The inner end of the end 70 of the pin 36 engages a low friction metallic bushing 80 that is seated in the end of the plug 68. Adjacent to the end of the bushing 80, an O-ring seal 82 is provided and held in place by a snap ring 84. The outermost end of the plug 68 is sealed by a disc 86. The disc 86 and O-ring 82 insure the retention of lubricant within the interior of the plug 68. This construction permits the crank shaft pin 36 to rotate within the plug 68 and the threads 76 are designed to carry any thrust loads.

The threaded portions 72, 74 and 76 have the same pitch so that the plug 68 may be assembled in the frame 24 and engage the pin 36 at the same time.

The rear corner of the arm 20 is connected to the rear cross-frame member 26 by a rubber bushing assembly 88. The rear bushing assembly 88 is similar in construction to the rubber bushing 38 and has a horizontal pivot axis in line with the pivot axis of the forward bushing 38. This common axis permits the arm 20 to pivot vertically in response to wheel movement.

During normal vertical arm movement the crank pin 36 will remain stationary due to the loading of the coil spring 28. At such times, vertical arm movement will occur by pivotal action within the rubber bushings 38 and 88.

The axis of the bushing 38 is vertically off-set beneath the pivot axis of the frame end 70 of the pin 36 so that the forward corner of the arm 20 is supported in a pendulum fashion. If the wheel 10 should strike a road obstacle having horizontal force components the arm 20 will tend to pivot horizontally about the rear bushing assembly 88 causing the crank-shaped pin 36 to cock and rotate about the axes of its end portions 48 and 70. Under the influence of the suspension spring 28 and rubber element 44 within the bushing 38 the arm 20 will return to its original position when the horizontal forces are removed, and the axes of the ends 48 and 70 of the pin 36 will once again lie in the same vertical plane.

In one physical embodiment of the invention, the vertical off-set of the ends 48 and 70 of the pin 36 was approximately one-half inch. Under normal driving conditions, the wheel 10 will be able to recede approximately ¼ of an inch. Greater displacement is possible under extreme driving conditions, however, as the end portions 48 and 70 of the crank pin 36 become horizontally off-set, there is a very rapid build up of forces that limits the wheel recession.

This structure provides a vehicle suspension system that is particularly adapted to absorb minor road shocks and prevent objectionable ride harshness.

The foregoing description presents the preferred embodiment of this invention. Alterations and modifications may occur to those skilled in the art that will come within the following claims.

We claim:

1. A suspension construction for a vehicle having a frame and a wheel;
   a suspension arm interconnecting said frame and wheel;
   said arm having fore and aft pivots;
   said aft pivot being adapted for both vertical and horizontal pivotal movement of said arm;
   a crank-shaped pivot pin operatively interposed at said fore pivot between said arm and said frame;
   a hollow plug having inner and outer threaded portions;
   said plug being threadably received in said frame;
   said pin having one end threadably received in said plug;
   said inner and outer threaded portions of said plug having identical pitch.

2. A vehicle suspension system having sprung and unsprung components;
   suspension means interconnecting said components;
   said suspension means including a suspension arm;
   a pivotal connection interconnecting said suspension arm and said sprung components;
   a crank mechanism pivotally suspending said suspension arm from said sprung components at a position spaced from said pivotal connection;
   said crank mechanism having a pair of spaced apart parallel pivot shafts;
   one of said pivot shafts being connected to said arm and the other of said pivot shafts being connected to said sprung components.

3. A vehicle suspension system having sprung and unsprung components;
   suspension means interconnecting said components;
   said suspension means including a suspension arm;
   a pivotal connection interconnecting said suspension arm and said sprung components;
   a crank mechanism pivotally suspending said suspension arm from said sprung components at a position spaced from said pivotal connection;
   said crank mechanism having a pair of vertically spaced apart pivot shaft portions and an intermediate portion;
   one of said pivot shaft portions being connected to said suspension arm and the other of said shaft portions being connected to said sprung components.

4. A vehicle suspension system having sprung and unsprung components;
   suspension means interconnecting said components;
   said means including a suspension arm having mutually independent spaced apart pivotal connections with said sprung components;
   one of said connections being adapted for both vertical and horizontal pivotal movement;
   the other of said connections having an intermediate link interposed between said sprung components and said suspension arm;
   said intermediate link having a pair of spaced apart pivot shaft portions;
   said shaft portions being parallel;
   one of said shaft portions being connected to said sprung components and the other of said shaft portions being connected to said suspension arm.

5. A motor vehicle suspension system having sprung and unsprung components;
   suspension means interconnecting said components;
   said means including a suspension arm having mutually independent spaced apart pivotal connections with said sprung components;
   one of said connections being adapted for both vertical and horizontal pivotal movement;
   the other of said connection having a crank mechanism interposed between said sprung components and said suspension arm;
   said crank mechanism having parallel vertically spaced apart pivot shafts;
   one of said shafts being connected to said sprung components and the other of said shafts being connected to said suspension arm.

6. A vehicle suspension system having sprung and unsprung components;
   suspension means interconnecting said sprung components;
   said means including a suspension from having mutually independent spaced apart pivotal connections with said sprung components;
   one of said connections being adapted for both vertical and horizontal pivotal movement;
   the other of said connections having an intermediate crank mechanism interposed between said sprung components and said suspension arm;
   said crank mechanism having a pair of parallel vertically spaced apart pivot shafts;
   said pivot shafts being joined by an intermediate portion;
   said shafts extending in opposite direction from said intermediate portion;
   one of said shafts being connected to said arm and the other of said shafts being connected to said sprung components.

7. A vehicle suspension system having sprung and unsprung components;
   suspension means interconnecting said components;
   said means including a suspension arm having mutually independent spaced apart pivotal connections with said sprung components;

one of said connections being adapted for both vertical and horizontal pivotal movement;

the other of said connection having an intermediate crank mechanism interposed between said sprung component and said suspension arm;

said mechanism having a pair of parallel pivot shaft portions;

one of said shaft portions being connected to said sprung components and the other of said shaft portions being connected to said suspension arm;

spring means interposed between said suspension arm and said sprung component and exerting a force on said mechanism tending to maintain said shaft portions in vertical alignment.

References Cited in the file of this patent

UNITED STATES PATENTS

| | | |
|---|---|---|
| 2,031,492 | Leighton | Feb. 18, 1936 |
| 2,372,744 | Sherman | Apr. 3, 1945 |
| 2,497,252 | Adams | Feb. 14, 1950 |

FOREIGN PATENTS

| | | |
|---|---|---|
| 78,172 | Germany | Mar. 18, 1894 |